US008475985B2

(12) United States Patent  (10) Patent No.: US 8,475,985 B2
Herbert et al.  (45) Date of Patent: Jul. 2, 2013

(54) MAGNETIC COMPOSITIONS

(75) Inventors: William G. Herbert, Williamson, NY (US); Gary Maier, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1535 days.

(21) Appl. No.: 11/116,530

(22) Filed: Apr. 28, 2005

(65) Prior Publication Data

US 2006/0246367 A1  Nov. 2, 2006

(51) Int. Cl.
*G03G 9/083* (2006.01)

(52) U.S. Cl.
USPC .................................... 430/106.1; 430/109.3

(58) Field of Classification Search
USPC ........................................... 430/106.1, 109.3
See application file for complete search history.

(56) References Cited

U.S. PATENT DOCUMENTS

| | | |
|---|---|---|
| 3,590,000 A | 6/1971 | Palermiti et al. |
| 3,655,374 A | 4/1972 | Palermiti et al. |
| 3,720,617 A | 3/1973 | Chatterji et al. |
| 3,983,045 A | 9/1976 | Jugle et al. |
| 3,998,160 A | 12/1976 | Pearce |
| 4,935,326 A | 6/1990 | Creatura et al. |
| 4,937,166 A | 6/1990 | Creatura et al. |
| 5,232,810 A * | 8/1993 | Ziolo .................... 430/108.1 |
| 5,278,020 A | 1/1994 | Grushkin et al. |
| 5,290,654 A | 3/1994 | Sacripante et al. |
| 5,308,734 A | 5/1994 | Sacripante et al. |
| 5,344,738 A | 9/1994 | Kmiecik-Lawrynowicz et al. |
| 5,346,797 A | 9/1994 | Kmiecik-Lawrynowicz et al. |
| 5,348,832 A | 9/1994 | Sacripante et al. |
| 5,364,729 A | 11/1994 | Kmiecik-Lawrynowicz et al. |
| 5,366,841 A | 11/1994 | Patel et al. |
| 5,370,963 A | 12/1994 | Patel et al. |
| 5,403,693 A | 4/1995 | Patel et al. |
| 5,405,728 A | 4/1995 | Hopper et al. |
| 5,418,108 A | 5/1995 | Kmiecik-Lawrynowicz et al. |
| 5,496,676 A | 3/1996 | Croucher et al. |
| 5,501,935 A | 3/1996 | Patel et al. |
| 5,527,658 A | 6/1996 | Hopper et al. |
| 5,585,215 A | 12/1996 | Ong et al. |
| 5,650,255 A | 7/1997 | Ng et al. |
| 5,650,256 A | 7/1997 | Veregin et al. |
| 5,723,253 A | 3/1998 | Higashino et al. |
| 5,744,520 A | 4/1998 | Kmiecik-Lawrynowicz et al. |
| 5,747,215 A | 5/1998 | Ong et al. |
| 5,763,133 A | 6/1998 | Ong et al. |
| 5,766,818 A | 6/1998 | Smith et al. |
| 5,804,349 A | 9/1998 | Ong et al. |
| 5,827,633 A | 10/1998 | Ong et al. |
| 5,840,462 A | 11/1998 | Foucher et al. |
| 5,853,944 A | 12/1998 | Foucher et al. |
| 5,863,698 A | 1/1999 | Patel et al. |
| 5,869,215 A | 2/1999 | Ong et al. |
| 5,902,710 A | 5/1999 | Ong et al. |
| 5,910,387 A | 6/1999 | Mychajlowskij et al. |
| 5,916,725 A | 6/1999 | Patel et al. |
| 5,919,595 A | 7/1999 | Mychajlowskij et al. |
| 5,925,488 A | 7/1999 | Patel et al. |
| 5,977,210 A | 11/1999 | Patel et al. |
| 6,312,768 B1 | 11/2001 | Rode et al. |
| 2003/0118928 A1 * | 6/2003 | Shimada .................... 430/108.1 |
| 2003/0186155 A1 * | 10/2003 | Aoki et al. ................. 430/111.4 |
| 2004/0023610 A1 | 2/2004 | Yongqi et al. |
| 2004/0058058 A1 * | 3/2004 | Shchegolikhin et al. ......... 427/7 |
| 2004/0068052 A1 * | 4/2004 | Uosaki et al. ................... 525/88 |
| 2005/0214539 A1 * | 9/2005 | Ying et al. .................... 428/408 |

FOREIGN PATENT DOCUMENTS

EP  1 349 012  10/2003

OTHER PUBLICATIONS

Schewe et al. "Carbon Nanofoam is the First Pure-Carbon Magnet," Physics News Update, No. 678 #1, Mar. 26, 2004.*
Ernie Tretkoff, "Nanofoam Exhibits Surprising Magnetic Properties", May 14, 2004, http://www.pa.msu.edu/~tomanek/publicity/magfoam-14may04.html.*
Cleveland, Cutler J; Morris, Christopher; Dictionary of Energy; 2006, Elsevier, p. 64.*
Collins, G., "Magnetic Soot", Scientific American, Jul. 2004, pp.
EP Communication dated Dec. 16, 2008, transmitting European Search Report for EP 06 11 3137.

* cited by examiner

*Primary Examiner* — Mark F Huff
*Assistant Examiner* — Rachel Zhang
(74) *Attorney, Agent, or Firm* — MDIP LLC

(57)  ABSTRACT

Compositions including carbon nanofoam are suitable for printing and magnetic ink.

9 Claims, No Drawings

MAGNETIC COMPOSITIONS

BACKGROUND

This disclosure relates to magnetic compositions for printing and, more specifically, to compositions having magnetic imaging character recognition capabilities.

Magnetic printing methods employ inks or toners containing magnetic particles. Various magnetic inks and toners have been used in printing digits, characters, or artistic designs, on checks, bank notes or currency. The magnetic inks used for these processes may contain, for example, magnetic particles, such as magnetite in a fluid medium, and a magnetic coating of ferric oxide, chromium dioxide, or similar materials dispersed in a vehicle including binders and plasticizers.

In situations requiring magnetic ink character recognition ("MICR") capabilities, the ink or toner selected should contain magnetic particles having a high level of remanence or retentivity. Retentivity is a measure of the magnetism remaining when the magnetic particle is removed from the magnetic field, i.e., the residual magnetism. When characters printed using an ink or toner having a sufficiently high retentivity are read, the magnetic particles produce a measurable signal that can vary in proportion to the amount of material deposited on the document being generated.

Acicular magnetite is one type of magnetic particle that, due to its retentivity and needle shape, has been used in magnetic inks and toners. For example, U.S. Pat. No. 3,998, 160, the entire disclosure of which is incorporated by reference herein, discloses an ink that includes shaped magnetic particles which are subjected to a magnetic aligning process while the ink is on a carrier in a wet state, thereby permitting the authenticity of the printing to be verified. Unfortunately, magnetite particles typically need to be processed or modified to enhance magnetic properties such as retentivity. The additional processing adds cost, time, and material to the process for making the ink or toner composition.

It would be advantageous to provide magnetic inks and toners that provide a number of advantages, including, for example, advantageous processing times.

SUMMARY

The present disclosure provides a magnetic toner composition including a carbon nanofoam and a polymer. Also described are magnetic ink compositions including a carbon nanofoam and a fluid carrier.

The present disclosure also provides a xerographic process that includes depositing a toner composition on a latent electrostatic image to form a toner image, the toner composition including a carbon nanofoam; transferring the toner image to a support surface; and affixing the transferred toner image to the substrate by heating.

Also described are magnetic ink character recognition ("MICR") processes including providing a substrate having a magnetic composition including a carbon nanofoam applied thereto to form at least one recognizable character; and scanning the substrate with a reading device.

In embodiments, the present disclosure describes a magnetically readable structure that includes a substrate having a magnetic composition associated with at least a portion thereof. The substrate may be paper (e.g., a check, bank note or currency) and the magnetic composition may be configured to define a recognizable character.

DETAILED DESCRIPTION OF EMBODIMENTS

Compositions for inks and toners that are useful for magnetic ink character recognition ("MICR") processes are described herein. The compositions include a carbon nanofoam. Further conventional ink or toner ingredients may also be included in the compositions.

Carbon nanofoam (also known as magnet soot) is a ferromagnetic allotrope of carbon. The carbon nanofoam particles are clusters of carbon atoms linked in graphite-like sheets that are given negative curvature by the inclusion of heptagons among the regular hexagonal pattern and strung together to form a web-like foam. Carbon nanofoam particles can be from about 1 to about 50 nanometers in diameter, in embodiments from about 5 to about 10 nanometers in diameter. The magnetic properties of the carbon nanofoam enable the carbon nanofoam of the present disclosure to replace some or all of both the magnetic particle component and the carbon black color pigment typically used in prior art ink and toner formulations. Hence, in embodiments the compositions of the present disclosure are substantially free of both magnetite and carbon black pigment. In embodiments, "substantially free" refers for example to an amount of magnetic or carbon black of from about 5% to about 0.0001% by weight of the total composition, in embodiments from about 3% to about 1% by weight of the total composition. Hence, the use of the carbon nanofoam can simplify the ink or toner composition in comparison to prior art formulations since fewer components are needed.

Carbon nanofoam can be produced by high-repetition-rate laser ablation in an argon-atmosphere which results in a high collision frequency between carbon atoms and ions in the laser plume and argon atoms in the chamber, creating vapor temperature and density suitable for the efficient formation of 4-membered $sp^3$ bonds typical of diamond. Pulsed laser deposition is a process wherein a high-intensity pulsed laser beam is focused on a target in a chamber that is either evacuated or filled with a specific gas such as argon, oxygen or nitrogen. The laser pulse ablates the target material, and the ablated vapor expands into the chamber. When a substrate is placed in the path of the laser-produced plume, the vapor adheres to the surface. The repetitive plumes lay down a thin film of the ablated material which, in the case of ablated carbon has the general appearance of soot. Processes and apparatus for pulsed laser deposition are described, for example in U.S. Pat. No. 6,312,768, the entire disclosure of which is incorporated herein in its entirety. Ultrafast evaporation of a graphite target in atmosphere of inert gases leads to a diffusion-limited aggregation of carbon atoms into a form of a fractal nanometer-size granular material. The ultrafast laser ablation technique can provide a carbon nanofoam formation rate on the order of about 1 $cm^3$/min. The bulk density of carbon nanofoam can be about $2 \times 10^{-3}$ $g/cm^{-3}$ to about $10 \times 10^{-3}$ $g/cm^{-3}$, with a specific surface area comparable to that of carbon aerogels (about 300 $m^2$/g to about 400 $m^2$/g).

At low temperatures, the as-deposited carbon nanofoam exhibits a strong positive electrostatic charge and non-linear current-voltage characteristics with strong hysteresis, indicative of its insulating nature. After annealing, the resistivity of the carbon nanofoam measured at low-voltage ($\pm 30$ V) is about $1 \times 10^9$ Ohm·cm to about $3 \times 10^9$ Ohm·cm at room temperature and about $1 \times 10^{13}$ Ohm·cm at 80° K to about $10 \times 10^{13}$ Ohm·cm at 80° K, with virtually no hysteresis. The carbon nanofoam contains numerous unpaired electrons, apaprently due to carbon atoms with only three bonds that are found at topological and bonding defects, so that the carbon nanofoam is attracted to magnets. Below $-183$° C. the carbon nanofoam itself can be made magnetic.

The carbon nanofoam can be present in the compositions described herein in an amount sufficient to provide an adequate MICR signal. The signal is determined by a standard calibration document as defined by the Banker's Association Standard and Specifications for MICR Encoded Document. Generally, each country sets a minimum percent signal level, for example the minimum signal level in the USA is 50 percent of the nominal, while in Canada it is 80 percent of the nominal. To ensure latitude in the printing process, it is generally desirable to exceed the nominal specification, for example the target signal which is about 115 to about 130 percent of the nominal to minimize the document rejection rates. "Adequate MICR" as used herein refers to a magnetic signal from about 50 percent to about 130 percent, where 100 percent refers, for example, to the nominal signal for readability by a check reader, and in embodiments from about 70 percent to about 115 percent. The carbon nanofoam can advantageously have a coercivity of from about 70 Oersteds ("Oe") to about 800 Oe and in embodiments from about 250 Oe to about 500 Oe, a remanent magnetization (Br) of about 10 to about 75 emu/gram and in embodiments about 23 to about 39 emu/gram, and a saturation magnetization (Bm) of about 50 to about 100 emu/gram and in embodiments about 70 to about 90 emu/gram. The carbon nanofoam can be present in an amount of about 0.1 to about 45 weight percent, in embodiments in an amount of about 0.1 to about 10 weight percent, and in embodiments in an amount of about 0.5 to about 5.0 weight percent of the toner components.

Carbon nanofoam can be formulated and processed into a suitable ink or toner using any technique. In embodiments, a magnetic ink includes carbon nanofoam and a liquid carrier. Any conventional liquid carrier can be employed. Suitable liquid carriers include, but are not limited to, aromatic alcohols and aliphatic alcohols having from about 1 to about 18 carbon atoms. Specific examples of suitable liquid carriers include one or more of the following: regular or high purity water, methanol, ethanol, iso-propyl alcohol, octane, dodecane, heptane, hexane, acetone, butyl acetate, glycol, glycerol, phenol, and the like. The liquid carrier can be present in magnetic inks in accordance with this disclosure in amounts from about 50 percent to about 95 percent by weight of the total composition, in embodiments from about 70 percent to about 90 percent by weight of the total composition. The magnetic ink can be applied to a substrate upon which magnetic printing is desired, and once the liquid carrier evaporates and the ink dries, a magnetic image or text remains on the substrate.

Processes for forming toner compositions for use with reprographic or xerographic print devices are known. For example, emulsion/aggregation/coalescing processes for the preparation of dry toners are illustrated in a number of patents, such as U.S. Pat. Nos. 5,290,654, 5,278,020, 5,308,734, 5,370,963, 5,344,738, 5,403,693, 5,418,108, 5,364,729, and 5,346,797; and also of interest may be U.S. Pat. Nos. 5,348,832; 5,405,728; 5,366,841; 5,496,676; 5,527,658; 5,585,215; 5,650,255; 5,650,256 and 5,501,935; 5,723,253; 5,744,520; 5,763,133; 5,766,818; 5,747,215; 5,827,633; 5,853,944; 5,804,349; 5,840,462; 5,869,215; 5,869,215; 5,863,698; 5,902,710; 5,910,387; 5,916,725; 5,919,595; 5,925,488 and 5,977,210, the entire disclosures of each of which are incorporated herein in their entirety by reference.

In embodiments, a process of the present disclosure involves aggregating a carbon nanofoam dispersion (including water, surfactant and, optionally a colorant) with a latex dispersion (including surfactant, water and resin), coalescing the aggregates generated, and then isolating, washing, and drying the resulting magnetic toner.

Surfactants can be present in the carbon nanofoam and latex dispersion utilized to form the toner composition in effective amounts of, for example, about 0.001 to about 15 weight percent, and in embodiments about 0.001 to about 0.1 weight percent of the toner components. Surfactants used in the toner composition can be anionic, nonionic, or cationic in nature. Examples of anionic surfactants include, for example, sulfates including sodium dodecylsulfate (SDS), sulfonates including sodium dodecylbenzene sulfonate, sodium dodecylnaphthalene sulfate, dialkyl benzenealkyl, abitic acid, and the like, and mixtures thereof. An effective concentration of the anionic surfactant generally employed is, for example, in an amount of about 0.01 to about 10 percent by weight, and in embodiments in an amount of about 0.1 to about 5 percent by weight of monomers used to prepare the toner polymer resin.

Examples of nonionic surfactants that may be, for example, included in the resin latex dispersion include polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy)ethanol, and the like, and mixtures thereof. A suitable concentration of the nonionic surfactant is, for example, from about 0.01 to about 10 percent by weight, in embodiments in an amount of about 0.1 to about 5 percent by weight of monomers used to prepare the toner polymer resin.

Examples of the cationic surfactants, which are usually positively charged, selected for the toners and processes of the present disclosure include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, and the like, and mixtures thereof. A suitable amount of surfactant can be selected, such as in an amount of about 0.1 to about 10 percent by weight of the toner components, and, in embodiments an amount of about 0.2 to about 5 percent by weight of the toner components. The choice of particular surfactants or combinations thereof as well as the amounts of each to be used are within the purview of those skilled in the art.

The toner composition may also optionally contain a colorant. Colorants include pigments, dyes, mixtures of pigments and dyes, mixtures of pigments, mixtures of dyes, and the like. Suitable colorants are known to those skilled in the art and are available from a variety of commercial sources. Various known colorants, such as pigments, can be present in the toner in an effective amount of, for example, from about 1 to about 15 percent by weight of toner, and in embodiments in an amount of from about 3 to about 10 percent by weight. Suitable colorants include, but are not limited to, carbon black. Generally, colored pigments that can be selected are cyan, magenta, red, brown, orange, or yellow pigments, and mixtures thereof. Examples of magentas that may be selected include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans that may be used include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL.

Illustrative examples of resins include, but are not limited to styrene acrylates, styrene butadienes, styrene methacrylates, and more specifically, poly(styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-butylacrylate), poly(styrene-butadiene), poly(styrene-isoprene), poly(styrene-butyl methacrylate), poly(styrene-butyl acrylate-acrylic acid), poly(styrene-butadiene-acrylic acid), poly(styrene-isoprene-acrylic acid), poly(styrene-butyl methacrylate-acrylic acid), poly(butyl methacrylate-butyl acrylate), poly(butyl methacrylate-acrylic acid), poly(styrene-butyl acrylate-acrylonitrile-acrylic acid), poly(acrylonitrile-butyl acrylate-acrylic acid), and the like, and combinations thereof. The latex polymer is generally present in the toner compositions of the present disclosure in various effective amounts, such as from about 30 weight percent to about 98 weight percent, in embodiments from about 75 weight percent to about 98 weight percent, and in embodiments from about 85 weight percent to about 96 weight percent of the toner components. The latex polymer size suitable for the processes of the present disclosure can be, for example, from about 0.01 to about 1.5 microns in volume average diameter as measured by the Brookhaven nanosize particle analyzer, and in embodiments from about 0.05 microns to about 1 micron in volume average diameter. Other sizes and effective amounts of latex polymer may be selected in embodiments.

In order to aid in the processing of the toner composition, counterionic coagulant having an opposite polarity to the ionic surfactant in the latex may optionally be used in the toner composition. The quantity of coagulant is present to, for example, prevent/minimize the appearance of fines in the final slurry. Fines refer to small sized particles of less than about 1 micron in average volume diameter, which can adversely affect toner yield. Counterionic coagulants may be organic or inorganic entities. For example, in embodiments of the present disclosure, the ionic surfactant of the resin latex dispersion can be an anionic surfactant, and the counterionic coagulant can be a polymetal halide or a polymetal sulfo silicate (PASS). Exemplary coagulants that can be included in the toner include polymetal halides, polymetal sulfosilicates, monovalent, divalent or multivalent salts optionally in combination with cationic surfactants, and the like. Inorganic cationic coagulants include, for example, polyaluminum chloride (PAC), polyaluminum sulfo silicate (PASS), aluminum sulfate, zinc sulfate, or magnesium sulfate. When present, the coagulant is used in an amount of about 0.05 to about 10 weight percent, in embodiments in an amount of about 0.075 to about 2 weight percent of the total toner composition.

Further optional additives surface additives, color enhancers, and the like. Surface additives include, for example, metal salts, metal salts of fatty acids, colloidal silicas, metal oxides, mixtures thereof and the like, which additives may be present in an amount of about 0.05 to about 5 percent and in embodiments in an amount of about 0.1 to about 2 percent by weight of the total toner composition. See, U.S. Pat. Nos. 3,590,000, 3,720,617, 3,655,374 and 3,983,045, the entire disclosures of each of which are incorporated herein by reference.

The dry toner compositions illustrated herein can be prepared by a number of known methods, including mechanical blending and melt blending the toner resin particles, carbon nanofoam, and surfactants followed by mechanical attrition. Other methods include those well known in the art such as spray drying, mechanical dispersion, melt dispersion, dispersion polymerization, and suspension polymerization. More specifically, the toner compositions may be prepared by the simple mixing of carbon nanofoam, polymeric resin, and additive particles while heating, followed by cooling. After cooling, the composition may be subjected to micronization to obtain toner size particles of, for example, an average diameter of about 5 microns to about 25 microns, and subsequently classifying these particles for the primary purpose of removing fines, for example particles with a diameter of about 4 microns or less, and very large coarse particles, for example, with a diameter of greater than about 30 microns. Also, the aforementioned toners can be prepared in a similar manner with an extrusion device wherein the product exiting from such a device is severed into pieces followed by micronization and classification.

Developer compositions can be prepared by mixing the toners in accordance with the present disclosure with known carrier particles, including coated carriers, such as steel, ferrites, and the like, as disclosed in U.S. Pat. Nos. 4,937,166 and 4,935,326, the entire disclosures of each of which are incorporated herein by reference. In embodiments, the developer compositions may contain, for example from about 2 percent toner concentration to about 8 percent toner concentration.

In embodiments, a toner for MICR according to the present disclosure includes at least a binder resin, carbon nanofoam and a wax as main components, and optionally contains a coloring agent, a releasing agent other than the wax, a charge controlling agent and other additives. A fluidizing agent may also be allowed to attach to the surface of toner particles.

Specific examples of the binder resin of the toner which may be utilized include homopolymers and copolymers of styrene and substituted styrene such as polystyrene, poly-p-chlorostyrene, polyvinyltoluene, styrene-p-chlorostyrene copolymer, styrene-vinyltoluene copolymer, and the like; copolymers of styrene and acrylic acid ester such as styrene-methyl acrylate copolymer, styrene-ethyl acrylate copolymer, styrene-n-butyl acrylate copolymer, and the like; copolymers of styrene and methacrylic acid ester such as styrene-methyl methacrylate copolymer, styrene-ethyl methacrylate copolymer, styrene-n-butyl methacrylate copolymer, and the like; styrene-acrylic acid ester-methacrylic acid ester terpolymer; styrene copolymers composed of styrene and other vinyl monomers such as styrene-acrylonitrile copolymer, styrene-vinyl methyl ether copolymer, styrene-butadiene copolymer, styrene-vinyl methyl ketone copolymer, styrene-acrylonitrile-indene copolymer, styrene-maleic acid ester copolymer, and the like; polymethyl methacrylate, polybutyl methacrylate, polyacrylic acid ester resin, polyester resin, polyvinyl acetate, polyamide resin, epoxy resin, polyvinyl butyral resin, polyacrylic acid-phenol resin, phenol resin, aliphatic or alicyclic hydrocarbon resin, petroleum resin, chlorinated paraffin, polyvinyl chloride, polyvinylidene chloride, and the like, which can be used alone or as a mixture of two or more of them. In embodiments, the binder resin includes poly(styrene butyl acrylate beta CEA) and poly(styrene butyl acrylate divinyl benzene beta CEA). The content of the resin binder in the toner can be from about 30 to about 98% by weight, and in embodiments about 70 to 98% by weight.

The wax is added in order to ensure excellent releasing property between a heating roll for fixation and the toner or to ensure excellent resistance against sliding friction with the magnetic head. In such a case, it is advantageous to add a wax having a DSC melting point in an amount of about 60° C. to about 110° C. and in embodiments about 85° to about 100° C. Illustrative examples of suitable waxes include hydrocarbon waxes, such as, polyolefin wax (such as polyethylene and polypropylene having a low molecular weight), paraffin wax, Fischer-Tropsch wax, carnauba wax, candelilla wax, rice wax, and the like. These waxes can be used alone or in various combinations. The content of the wax in the toner can be from about 2 to about 15% by weight, and in embodiments about 4 to about 10% by weight.

The toner for MICR may also contain a charge controlling agent. Charge controlling agents are classified into a charge controlling material which affords positive charge to the toner and a charge controlling material which affords negative charge to the toner. Specific examples of the positive charge controlling material include nigrosine and nigrosine modified with a metal salt of fatty acid, quaternary ammonium salts such as tributylbenzylammonium-1-hydroxy-4-naphthosulfonate, tetrabutylammonium tetrafluoroborate, and the like, di-organo-tin oxides such as dibutyltin oxide, dioctyltin oxide, dicyclohexyltin oxide, and the like, di-organo-tin borates such as dibutyltin borate, dioctyltin borate, dicyclohexyltin borate, and the like Charge controlling agents can be used alone or in combinations of two or more thereof. Specific examples of the negative charge controlling material include organometallic compounds and chelate compounds such as acetylacetone metal chelate, monoazo metallic chelate, metallic chelate or salt of naphthoic acid or salicylic acid, and combinations thereof. Charge controlling agents can be present in amounts from about 0.05 to about 10% by weight and in embodiments amounts from about 0.1 to about 5% by weight.

Suitable coloring agents may optionally be utilized. Colorants include pigments, dyes, mixtures of pigments and dyes, mixtures of pigments, mixtures of dyes, and the like. Suitable colorants are known to those skilled in the art and are available from a variety of commercial sources. Various known colorants, such as pigments, can be present in the toner in an effective amount of, for example, from about 1 to about 15 percent by weight of toner, and in embodiments in an amount of from about 3 to about 10 percent by weight. Suitable colorants include, but are not limited to, carbon black. Generally, colored pigments that can be selected are cyan, magenta, red, brown, orange, or yellow pigments, and mixtures thereof. Examples of magentas that may be selected include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans that may be used include copper tetra(octadecyl sulfonamido) phthalocyanine, x-copper phthalocyanine pigment listed in the Color Index as CI 74160, Cl Pigment Blue, and Anthrathrene Blue, identified in the Color Index as CI 69810, Special Blue X-2137, and the like; while illustrative examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL.

Further, higher fatty acid (e.g., stearates, oleates, behenates and the like), olefin-maleic acid anhydride copolymer, and the like may be added to the toner in amounts from about 0.5 to about 50% by weight, and in embodiments from about 1 to about 30% by weight. Also, it may be advantageous to attach a fluidizing agent to the surface of toner particles. Suitable fluidizing agents include silica (e.g., hydrophobic silica) and titanium dioxide. Fluidizing agents may be present in amounts from about 0.1 to about 5% by weight, and in embodiments from about 0.5 to about 2% by weight.

The toner for MICR can be produced by any known method including blending the above mentioned components, melting with kneading the mixture and pulverizing the resultant mass. Moreover, it may be produced by a polymerization method which includes blending monomers for the binder with other ingredients and polymerizing the mixture.

In embodiments of the present disclosure, an imaging process is contemplated. The imaging process includes the generation of an image in an electronic printing magnetic image character recognition apparatus and thereafter developing the image with a toner composition of the present disclosure. The formation and development of images on the surface of photoconductive materials by electrostatic means is well known. The basic xerographic process involves placing a uniform electrostatic charge on a photoconductive insulating layer, exposing the layer to a light and shadow image to dissipate the charge on the areas of the layer exposed to the light and developing the resulting latent electrostatic image by depositing on the image a finely-divided electroscopic material referred to in the art as "toner". The toner will normally be attracted to those areas of the layer which retain a charge, thereby forming a toner image corresponding to the latent electrostatic image. This powder image may then be transferred to a support surface such as paper. The transferred image may subsequently be permanently affixed to the support surface as by heat. Instead of latent image formation by uniformly charging the photoconductive layer and then exposing the layer to a light and shadow image, one may form the latent image by directly charging the layer in image configuration. Thereafter, the powder image may be fixed to the photoconductive layer if elimination of the powder image transfer step is desired. Other suitable fixing means such as solvent or overcoating treatment may be substituted for the foregoing heat fixing step.

The present disclosure also provides a magnetic ink concentrate containing carbon nanofoam particles in water or alcohol in the presence of a dispersant, and processes for the preparation of such inks. These magnetic inks are suitable, for example, for use in connection with inkjet printers.

Magnetic inks may be in the form of dispersions of carbon nanofoam particles in water or alcohol in the presence of a dispersant, wherein the dispersant consists of at least one polyelectrolyte. Polyelectrolytes which are suitable for the magnetic ink concentrates have a molecular weight of from about 1,000 to about 25,000, in some embodiments from about 3,500 to about 10,000. Specific examples of suitable polyelectrolytes include polyacrylic acid, acrylic acid/acrylamide copolymers and polyvinylphosphonic acid, and the alkali metal salts of these compounds. Conventional carriers, such as water or alcohols, can be used as carriers for the present magnetic ink concentrates. Examples of alcohols are ethylene glycol, diethylene glycol, glycerol, and mixtures of these alcohols with water. The amount of these substances is based on the specific surface area of the carbon nanofoam particles and is not less than about 0.7 mg per m² of surface area, in embodiments from about 1.5 to about 5 mg/m² can be particularly advantageous.

In addition to these components, the magnetic ink concentrates of the present disclosure may also contain additives for regulating the flow behavior of the concentrate, for example alkyl phenolates. It is also possible to add high boilers, such as diethylene glycol, ethylene glycol, glycerol and polyethylene glycol in minor amounts for establishing advantageous flow and drying properties. By adding colorants or dyes, it is also possible to vary the depth of the ink concentrates, provided that saturation magnetization is not adversely affected.

The magnetic ink concentrates of the present disclosure can be prepared in a conventional manner. In embodiments a mixture of water or alcohol and the polyelectrolyte and/or its alkali metal salt in the form of a solution having a strength of about 10% to about 90% by weight is stirred with the carbon nanofoam, and the suspension is then dispersed for from about 30 minutes to about 2 hours under the action of high shear forces. The temperature may increase to about 70° C. during this procedure. The components may be added in any order. Centrifuging is then carried out for a time from about 10 minutes to about 2 hours at from about 200 G to about 2,000 G, and any sedimented particles are separated off. The resulting product corresponds to the magnetic ink concentrates.

The magnetic ink concentrates of the present disclosure are very useful as a magnetic ink for writing apparatuses, for example inkjet printers. The resulting text image is mar-resistant, crisp, not blurred. The magnetic ink concentrates can also be used for information storage by means of a magnetic bar code since the high magnetic susceptibility makes it particularly suitable for this purpose.

Magnetically readable structures are also contemplated by this disclosure. The magnetically readable structure includes a substrate having a magnetic composition disposed thereon. The magnetic composition contains carbon nanofoam and can be, for example, any of the compositions described above. The substrate may be made of any material and, in embodiments is paper, such as a check, a bank note or currency. The substrate may also be made of plastic, such as a swipe card, credit card or the like. In embodiments, the substrate is not limited to sheets or cards but rather can have any shape. For example, the substrate may be factory or store inventory that is imprinted with a carbon nanofoam-containing magnetic composition in accordance with the present disclosure. In such instances, the magnetic reading or character recognition can be achieved by passing the object so labeled over a magnetic scanner or by using a hand-held magnetic scanner.

The following Examples illustrate embodiments of the present disclosure. These Examples are intended to be illustrative only and are not intended to limit the scope of the present disclosure. Also, parts and percentages are by weight unless otherwise indicated.

EXAMPLES

Preparation of Starting Materials

A non-crosslinked latex comprised of 40 weight percent of submicron, 0.5 micron diameter resin particles of styrene/butylacrylate/β-CEA suspended in an aqueous phase containing anionic surfactant ("Latex A"), a cross-linked latex comprised of 40 percent crosslinked resin, (resin ratio is 65:35:3 pph:1 pph of styrene:butyl acrylate: β-CEA:DVB) 58.5 percent water and 1.5 percent anionic surfactant ("Latex B"), a wax dispersion containing a low molecular weight wax and an anionic surfactant/dispersant wherein the wax slurry has a solid loading of 30 percent (weight percent throughout), and a pigment dispersion containing 19 percent carbon black, 2 percent of an anionic surfactant, and 79 percent water are prepared as described in U.S. Pat. No. 6,767,684, the entire disclosure of which is incorporated herein by this reference.

Example I

A magnetic toner composition is prepared as follows:

110 Grams of carbon nanofoam is added to 600 grams of water containing 1.3 grams of 20 percent aqueous anionic surfactant (NEOGEN RK™). The resultant mixture is then polytroned or homogenized for a period of 3 minutes at speeds of 5,000 rpm to provide a carbon nanofoam dispersion. To the resulting carbon nanofoam dispersion is added 90 grams of a dispersion of the above submicron polyethylene P850 wax particles (30 percent solids) followed by the addition of 285 grams of the above prepared anionic Latex A comprising submicron latex particles (40 percent solids) of styrene/butylacrylate/beta CEA, and 37.5 grams of the crosslinked Latex B of styrene/butylacrylate/divinyl benzene beta CEA (40 percent solids) and then polytroned at speed of 5,000 rpm for a period of 5 minutes. 300 Grams of water is then added to reduce the viscosity of the resulting blend to which then is added an aqueous polyaluminum chloride (PAC) coagulant solution comprising 2.25 grams of 10 percent solids placed in 23 grams of 0.3 M nitric acid.

The resulting blend is then heated to a temperature of 50° C. while stirring for a period of 30 minutes to obtain a particles size from about 5.0 to about 5.5. To this is added a cationic surfactant of 1.6 grams of alkylbenzyl dimethyl ammonium chloride SANIZOL B™ (50 percent solids), dissolved in 15 grams of water. The mixture is then stirred for a period of 90 minutes to produce toner size aggregates from about 5.5 to about 6.0 microns. 120 Grams of the above noncrosslinked latex are then added to the aggregate mixture and stirred at 50° C. for an additional 30 minutes to provide a particle size from about 6.0 to about 7.0 microns. The aggregate mixture is then stabilized from further growth by changing the pH of the mixture from about 2.6 to about 7.3 with an aqueous solution of 4 percent sodium hydroxide. The resulting mixture is then heated to 93° C. during which the pH is from about 7.2 to about 7.4 with the addition of aqueous 4 percent sodium hydroxide solution. After 1 hour at 93° C., the pH is reduced in stages of 6.5 followed by 5.7 after an additional 30 minutes to an aqueous 1.25 percent of nitric acid solution. After a period of 6 hours at 93° C., the particle size measured is from about 6.0 to about 7.5 microns. The resultant mixture is cooled and the toner obtained is washed 4 times with water and dried on a freeze dryer. The resulting toner, when developed by an electrographic process on a document, provides an adequate MICR signal for the encoded document while also being substantially free of carbon black pigment and magnetite.

Example II

A magnetic toner composition is prepared as follows:

110 Grams of carbon nanofoam is added to 600 grams of water containing 1.3 grams of 20 percent aqueous anionic surfactant (NEOGEN RK™) to which 82.5 grams of the above 19 percent carbon black pigment dispersion is added. The resultant mixture is then polytroned or homogenized for a period of 3 minutes at speeds of 5,000 rpm to provide a carbon nanofoam/pigment dispersion. To the resulting carbon nanofoam/pigment dispersion is added 90 grams of a dispersion of the above submicron polyethylene P850 wax particles (30 percent solids) followed by the addition of 285 grams of the above prepared anionic Latex A comprising submicron latex particles (40 percent solids) of styrene/butylacrylate/ beta CEA, and 37.5 grams of the crosslinked Latex B of styrene/butylacrylate/divinyl benzene beta CEA (40 percent solids) and then polytroned at speed of 5,000 rpm for a period of 5 minutes. 300 Grams of water is then added to reduce the viscosity of the resulting blend to which then is added an aqueous PAC coagulant solution comprising 2.25 grams of 10 percent solids placed in 23 grams of 0.3 M nitric acid.

The resulting blend is then heated to a temperature of 50° C. while stirring for a period of 30 minutes to obtain a particles size from about 5.0 to about 5.5. To this is added a cationic surfactant of 1.6 grams of alkylbenzyl dimethyl ammonium chloride SANIZOL B™ (50 percent solids), dissolved in 15 grams of water. The mixture is then stirred for a period of 90 minutes to produce toner size aggregates from about 5.5 to about 6.0 microns. 120 Grams of the above noncrosslinked latex are then added to the aggregate mixture and stirred at 50° C. for an additional 30 minutes to provide a particle size from about 6.0 to about 7.0 microns. The aggregate mixture is then stabilized from further growth by changing the pH of the mixture from about 2.6 to about 7.3 with an aqueous solution of 4 percent sodium hydroxide. The resulting mixture is then heated to 93° C. during which the pH is from about 7.2 to about 7.4 with the addition of aqueous 4 percent sodium hydroxide solution. After 1 hour at 93° C., the pH is reduced in stages of 6.5 followed by 5.7 after an additional 30 minutes to an aqueous 1.25 percent of nitric acid solution. After a period of 6 hours at 93° C., the particle size measured is from about 6.0 to about 7.5 microns. The resultant mixture is cooled and the toner obtained is washed 4 times with water and dried on a freeze dryer. The resulting toner, when developed by an electrographic process on a document, provides an adequate MICR signal for the encoded document.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A magnetic toner composition comprising a carbon nanofoam and a polymer, wherein the toner composition is substantially free of a magnetite.

2. The magnetic toner composition of claim 1, wherein the carbon nanofoam is present in an amount from about 0.1 to about 45 percent by weight of the total toner composition.

3. The magnetic toner composition of claim 1, wherein the carbon nanofbam is present in an amount from about 0.1 to about 10 percent by weight of the total toner composition.

4. The magnetic toner composition of claim 1, wherein the polymer is selected from the group consisting of poly(styrene-alkyl acrylate), poly(styrene-1,3diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly (aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), poly(alkyl acrylate-acrylonitrile-acrylic acid), poly (styrene-butadiene), poly(methylstyrene-butadiene), poly (methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), poly(styrene-butyl acrylate-acrylononitrile-acrylic acid) and optionally mixtures thereof.

5. The magnetic toner composition of claim 1, wherein the polymer is present in an amount from about 30 to about 98 percent by weight of the total toner composition.

6. The magnetic toner composition of claim 1, further comprising one or more components selected from the group consisting of surfactants, coagulants, colorants, waxes and optionally mixtures thereof.

7. A xerographic system comprising a charging component, an imaging component, a development component, a transfer component and a fixing component, wherein the development component comprises a toner in accordance with claim 1.

8. The magnetic toner composition of claim wherein the carbon nanofoam has a coercivity of from about 70 Oersteds to about 800 Oersteds.

9. The magnetite toner composition of claim 1, wherein the magnetic toner composition is substantially free of carbon black.

* * * * *